(12) United States Patent
Henrique Silva et al.

(10) Patent No.: US 11,783,412 B2
(45) Date of Patent: Oct. 10, 2023

(54) SYSTEM AND METHODS FOR DEPOSIT TRANSACTIONS

(71) Applicant: NCR Corporation, Atlanta, GA (US)

(72) Inventors: Lucas Henrique Silva, Mountain View, CA (US); Tim Gerlach, Atlanta, GA (US); Tomasz Kruczek, Dundee (GB); Garrett Paul Schubiner, Burlingame, CA (US); Bruce McBain, Pleasanton, CA (US); Tamela A. Wenzel, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 17/458,817

(22) Filed: Aug. 27, 2021

(65) Prior Publication Data
US 2023/0062282 A1    Mar. 2, 2023

(51) Int. Cl.
| | | |
|---|---|---|
| *G06Q 40/02* | (2023.01) | |
| *G06Q 20/40* | (2012.01) | |
| *G06Q 30/018* | (2023.01) | |
| *G06V 20/40* | (2022.01) | |
| *G06Q 20/10* | (2012.01) | |
| *G06Q 20/18* | (2012.01) | |
| *G06Q 20/20* | (2012.01) | |
| *G06Q 20/32* | (2012.01) | |
| *H04L 67/55* | (2022.01) | |

(52) U.S. Cl.
CPC ........... *G06Q 40/02* (2013.01); *G06Q 20/208* (2013.01); *G06Q 20/209* (2013.01); *G06Q 20/3276* (2013.01); *G06Q 20/4016* (2013.01); *G06Q 30/0185* (2013.01); *G06V 20/40* (2022.01); *H04L 67/55* (2022.05); *G06Q 20/1085* (2013.01); *G06Q 20/18* (2013.01)

(58) Field of Classification Search
CPC .... G06Q 40/02; G06Q 20/208; G06Q 20/209; G06Q 20/3276; G06Q 20/4016; G06Q 30/0185; H04L 67/55; G06V 20/40
See application file for complete search history.

(56) References Cited

U.S. PATENT DOCUMENTS 6,626,357 B1 *  9/2003  Ross ....................... E05G 7/001
                                                         902/8
7,617,133 B1 * 11/2009  Antony .............. G06Q 30/0631
                                                         705/28

(Continued)

*Primary Examiner* — Asfand M Sheikh
(74) *Attorney, Agent, or Firm* — Schwegman Lundberg & Woessner, P.A.

(57) ABSTRACT

Pre-staged deposit details for a deposit are received from a deposit interface and the details are linked to a code associated with a deposit bag. The code is subsequently scanned at a terminal, the pre-staged details are obtained based on the code, a lock box of the terminal is unlocked for the bag to be dropped into the lock box, a deposit transaction is processed based on the pre-staged details, and the box is locked. A real-time notification is provided within a staff interface that identifies the terminal and the transaction. The code is scanned when that bag is removed from the lock box and the pre-staged details are populated within the staff interface. Staff details are recorded for the transaction during a verification procedure. The staff details are posted to a financial institution backend system and any discrepancies between the pre-staged details and the staff deposit details are noted.

20 Claims, 3 Drawing Sheets

(56) References Cited

U.S. PATENT DOCUMENTS

| | | | | |
|---|---|---|---|---|
| 8,550,338 B1* | 10/2013 | Nichols | G06Q 20/405 | 235/375 |
| 9,004,352 B1* | 4/2015 | Graef | G07F 19/202 | 235/491 |
| 10,304,295 B1* | 5/2019 | Rhodes | G06Q 20/4016 | |
| 11,308,466 B1* | 4/2022 | Goetz | G07F 19/00 | |
| 2003/0144957 A1* | 7/2003 | Skinner | G06Q 40/02 | 705/42 |
| 2004/0210515 A1* | 10/2004 | Hughes | G06Q 20/10 | 705/39 |
| 2005/0108164 A1* | 5/2005 | Salafia | G06Q 20/047 | 705/42 |
| 2005/0273425 A1* | 12/2005 | Yamazaki | G06Q 20/10 | 705/39 |
| 2007/0299791 A1* | 12/2007 | Mack | G06Q 10/0837 | 705/402 |
| 2008/0120232 A1* | 5/2008 | Herrin | G07D 11/30 | 235/487 |
| 2009/0006249 A1* | 1/2009 | Morgan | G06Q 20/10 | 705/39 |
| 2010/0010918 A1* | 1/2010 | Hunt | G06Q 20/102 | 705/40 |
| 2010/0241487 A1* | 9/2010 | Wolfson | G06Q 20/10 | 705/38 |
| 2010/0274728 A1* | 10/2010 | Kugelman | G06Q 50/188 | 705/28 |
| 2011/0089230 A1* | 4/2011 | Artino | G07D 1/00 | 235/379 |
| 2011/0167000 A1* | 7/2011 | Mon | G06Q 20/1085 | 705/43 |
| 2013/0264387 A1* | 10/2013 | Siemens | G07D 11/0093 | 235/382 |
| 2014/0166745 A1* | 6/2014 | Graef | G07F 19/00 | 235/379 |
| 2014/0263617 A1* | 9/2014 | Johnson | G06Q 20/108 | 235/379 |
| 2016/0350995 A1* | 12/2016 | Mizuno | G07D 7/003 | |
| 2017/0091711 A1* | 3/2017 | Akselrod | G06Q 10/0833 | |
| 2018/0053193 A1* | 2/2018 | Charbonneau | G06Q 30/016 | |
| 2018/0247481 A1* | 8/2018 | Gilbertson | G06Q 30/06 | |
| 2021/0042739 A1* | 2/2021 | McIntyre | G06Q 20/382 | |
| 2021/0074101 A1* | 3/2021 | Pertz | G07C 9/00182 | |

\* cited by examiner

SYSTEM AND METHODS FOR DEPOSIT TRANSACTIONS

BACKGROUND

Merchant deposits in night-drop boxes and other automated bulk deposit processes are prevalent in the banking industries. In it's current state, existing solutions do not provide an acceptable level of service to banking customers. Existing solutions are decades old, are paper-based, replete with logistical issues, require complex enrollment processes, are costly to maintain, and remain disconnected from the online main backend banking systems (lack any technology integration).

For example, maintaining a night-drop box requires a variety of complex and oftentimes superfluous processes. The safe associated with the night-drop box must be manually opened daily, even when there were no deposits made. This puts the Automated Teller Machine (ATM), which includes the drop box, offline while the safe is opened and inspected during the daily startup procedure. A national bank can have 5,000 or more ATMs with drop boxes, such that the startup procedure is costly in terms of staff hours and lack of customer access during daily startup.

Moreover, enrollment for a deposit drop box requires an in-person visit to a bank during which the customer receives a physical key to open the drop box. If the customer subsequently loses the key, the customer has to return to the bank to get a replacement key and in some cases, the bank is forced to rekey the drop box and issue replacement keys to existing customers of the rekeyed drop box. The customer also has to obtain special deposit bags for use with deposits and paper-based deposit slips before the customer can actually perform deposit drops.

Further, when a customer makes a deposit into an ATM's drop box, the bank receives no real-time information about the deposit such as the identity of the depositing customer, the amount of deposit, etc. The bank only learns of the deposit during the ATM daily startup procedure the next business day following the deposit. While the customer is waiting for the deposit to post, the customer may be in need of credit against the deposit, which is unavailable to the customer. Additionally, the bank does not have an adequate accounting of real-time cash on hand until the deposit is fully processed.

The deposit bag's retrieval from the drop box and a full and accurate accounting of the deposit requires two staff members to engage in very specific and controlled actions, each action must be fully attested to by both staff members in an audit log. Once the actions are recorded, a staff member is responsible for entering the deposit details into the banking system to complete the deposit. It is at this point that the bank has an adequate reflection of cash on hand and the customer is informed that the deposit posted to the customer's account (with any checks deposited still pending when applicable). If a depositor's details do not match the staff-determined details for the deposit, it becomes very difficult to determine whether or not any discrepancy occurred with the depositor or with the staff and even more difficult to determine where in the process the discrepancy was made (if made by the staff when processing the deposit).

SUMMARY

In various embodiments, A system and methods for digitally processing deposits, are presented.

According to an embodiment, a method for digitally processing a deposit is presented. As an example, pre-staged deposit details associated a drop box deposit that is planned to be made by a customer are received. A bag identifier for a deposit bag and a customer identifier for the customer are linked to the pre-staged deposit details. The bag identifier is received from a terminal and the terminal is instructed to open a lock box of the terminal. The pre-staged deposit details and an account are obtained based on the bag identifier and based on the customer identifier. A notification is sent to a staff interface that identifies the pre-staged deposit details and the account and that indicates the deposit bag was received in the lock box of the terminal.

DETAILED DESCRIPTION

Figure 1:
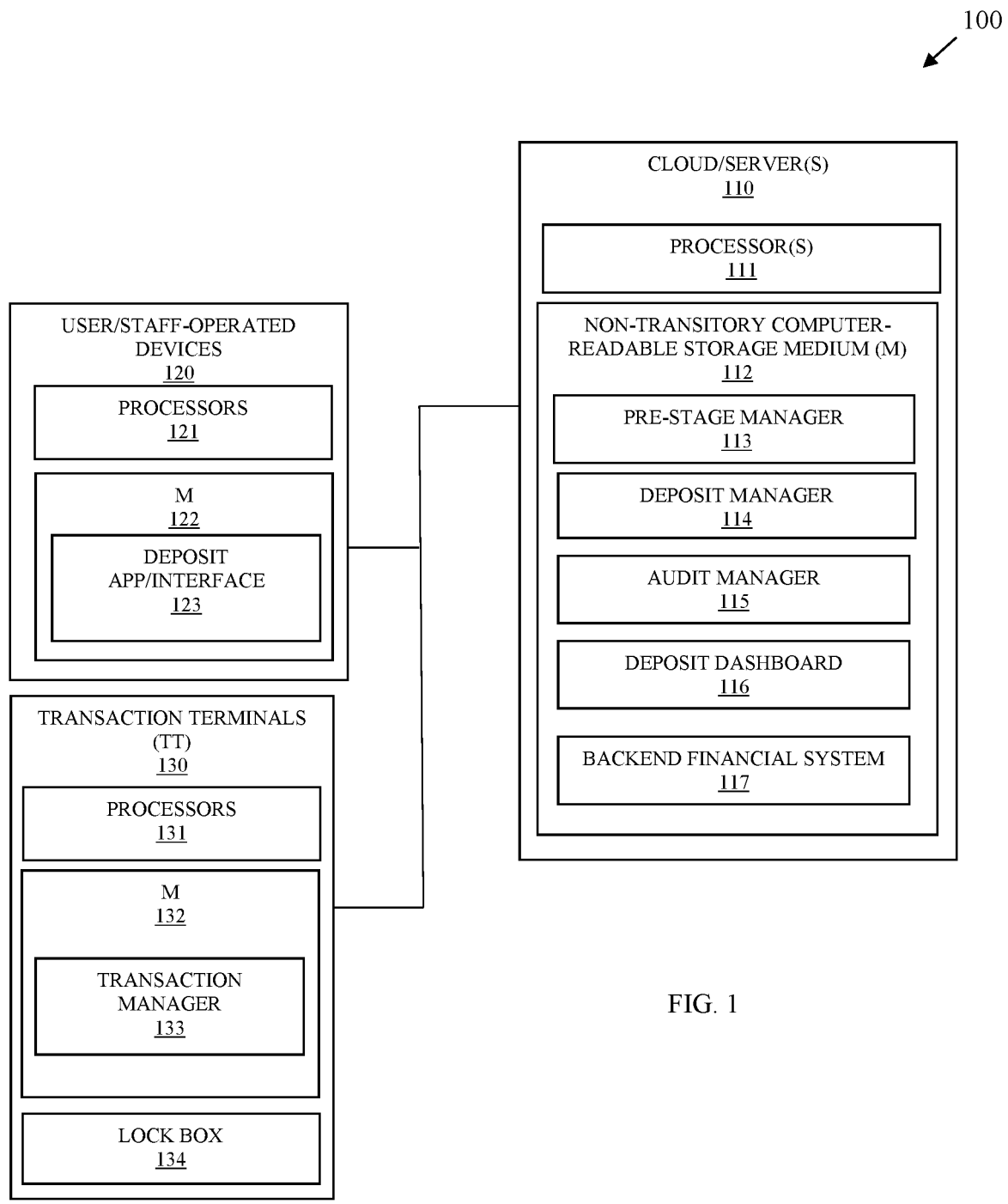
FIG. 1 is a diagram of a system for digitally processing deposits, according to an example embodiment.

FIG. 1 is a diagram of a system/platform 100 for digitally processing deposits, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of digitally processing deposits, presented herein and below.

System/platform 100 (herein after just "system 100") provides a processing environment and workflows by which lock-box deposits are processed, verified, posted to a deposit dashboard, and posted to a financial institution's backend system. Pre-staged deposit details for a customer deposit are received through a user interface. A code assigned or affixed to a deposit bag is received through the user interface and linked to the pre-staged deposit details. The customer scans the code of the bag at a transaction terminal, the code is used to identify the pre-staged transaction details, and a lock on a lock deposit box associated with the terminal is unlocked opening a shutter of the drop box for the customer to drop the deposit bag into the lock box. The pre-staged transaction details are processed as a pending deposit transaction with the financial backend system and the lock box shutter is shut to relock the lock box. A real-time deposit notification for the pending deposit transaction is posted within a staff interface operated by staff of the financial institution. When the lock box is opened by staff to retrieve the deposit bag, the code is scanned through the staff interface (or entered into the staff interface into interface menu options), matched to the pending deposit transaction, and an interface screen of the staff interface is prepopulated with the pre-staged deposit details (originally provided by the customer through the user interface). The staff member that removed the bag does so under existing security and auditing protocols associated with the financial institution for purposes of independent counting each deposit currency denomination and any checks and providing within the deposit bag. This may entail two staff members be present and verify each other's actions during removal of the bag, counting of the currency and checks, and properly locating the removed and counted currency and checks to protocol locations within the financial institution. The final recorded totals by the staff member for each denomination of currency and for any checks are then recorded in the staff interface; checks that cannot be immediately cleared (drawn on a different institution account) are identified as pending. The currency denomination totals are updated to the financial institution's (branch) on hand currency inventory and a dashboard rendered on the staff interface on staff devices reflects the updated totals of cash on hand. The user interface is pushed a notification that the deposit was recorded along with any pending checks that are still awaiting clearance from the institutions upon which the checks were drawn.

As will be demonstrated more completely herein, system 100 provides a real-time and improved/enhanced platform that comprises novel devices, interfaces, and workflows by which a drop-box deposit is recorded, processed, monitored, and audited. System 100 and workflows discussed herein eliminate existing drop box deposit issues, which are associated with security, time delays, expenses, and audit tracking.

As used herein the terms "consumer," "customer," and/or "depositor" may be used interchangeably and synonymously. This refers to an individual that operates a device and performs a drop-box valuable media deposit.

"Valuable media" refers to media of value, such as government backed notes/currency, checks, redeemable tickets, coupons, gift certificates, tokens, etc.

A "staff member" refers to an employee or an agent of a financial institution for which a drop box deposit was made by a consumer.

A "drop box deposit" comprises a special type of deposit that is made at a transaction terminal by a consumer. The valuable media that is being deposited is sealed or locked within a bag, sack, or any large/oversized envelope and the deposit is dropped or inserted into a safe or secure compartment of a transaction terminal by the consumer to relinquish possession of the valuable media to the financial institution for crediting to an account of the consumer with the financial institution or for crediting to an account of the consumer with another financial institution different from the financial institution associated with the transaction terminal.

The phrases "drop box" and/or "lock box" may used may be used interchangeably and synonymously herein. This refers to an integrated electromechanical component/module of the transaction terminal that temporarily securely holds/sores the deposit bag. The component/module is interfaced to or connected to a secure compartment that stores/contains the valuable media deposits made at the terminal by a consumer. The component/module comprises a shutter that is electronically locked (shut or closed) and unlocked (opened) by instruction provided by the terminal during a deposit. When the shutter is opened and unlocked an opening or an aperture is accessible to receive the deposit bag and the terminal closes (relocks) the shutter, such that there is no longer any opening or aperture through which any bag can be inserted. Closing or relocking of the shutter may also be activated by a sensor once the bag is detected as having been inserted into the opening. Once the shutter is closed following a deposit, an internal component of the drop box moves or causes the deposit bag to be transported, urged, or fall through a chute into a second secure area (secure compartment) connected to the drop box, such that when the shutter is opened there is no access to the secure compartment that is available to the depositor and it is only after the shutter is locked and closed that access to the secure compartment is internally accessible from the drop box.

In an embodiment, the secure compartment is a safe located within a bank branch. In this embodiment, the terminal may be integrated into a wall (such as exterior wall but could also be an interior wall within the bank branch) where the bag is dropped or deposited into the safe (secure compartment) only after the shutter closes and the bag is moved or is urged from the opening behind the shutter. For example, a consumer deposits the bag through the opening and when the shutter closes a chute is opened inside the drop box and the bag is transported or urged along a transport path into a safe room that is internal to the bank branch. Here, the drop box is connected to the secure compartment, but the secure compartment is not physically integrated within a housing of the terminal.

In an embodiment, the secure compartment is wholly contained or integrated within the terminal, such that the secure compartment is a second secure area or safe securely connected to the drop box within a housing of the terminal (the first secure area being the opening (opening area) revealed when the shutter of the drop box is opened).

Conventionally, physical key holes (locks) were needed to unlock a conventional drop box. Customers were given keys to open the conventional drop box, which meant a lost key might have caused the physical key holes (locks) to be rekeyed/replaced and new keys distributed to all customers of the conventional drop box. Conventionally transaction terminals were also not aware of any drop-box deposits being made since conventional terminals merely provided a non-electromechanical component by which customers opened with a physical key and dropped their conventional deposit bags in along with manually filled in deposit slips. Conventionally, staff of the bank (financial institution (FI) were only aware of deposits when the safes were opened during daily startup and/or end of day procedures.

All of these existing conventional problems for drop box deposits are alleviated with system 100, workflows, devices, and interfaces described herein.

System 100 comprises a cloud/server 110, user-operated devices 120, and transaction terminals 130.

Cloud/Server 110 comprises at least one processor 111 and a non-transitory computer-readable storage medium 112. Medium 112 comprises executable instructions for a pre-stage manager 113, deposit manager 114, audit manager 115, deposit dashboard interface 116, and backend financial system 117. The executable instructions when provided to and executed by processor 111 from medium 112 cause processor 111 to perform the processing discussed herein and below for 113-117.

Each user/staff-operated device 120 comprises at least one processor 12 and a non-transitory computer-readable storage medium 122. Medium 122 comprises executable instructions for a deposit/application (app) interface 123. The executable instructions when provided to and executed by processor 121 from medium 122 cause processor 121 to perform the processing discussed herein and below for 123.

Each transaction terminal 130 comprises at least one processor 131 and a non-transitory computer-readable storage medium 132. Medium 132 comprises executable instructions for a transaction manager 133. The executable instructions when provided to and executed by processor 131 from medium 132 cause processor 131 to perform the processing discussed herein and below for transaction manager 133. Each terminal 130 also comprises a lock box 134 or a drop box 134.

Initially a customer of a FI enrolls for drop-box deposit transactions for their financial account. The registering customer operates deposit/app interface 123 for providing requisite registration information to the FI for the customer's account. The deposit/app interface 123 may provide for automatic delivery or in-branch pickup of deposit bags (the bags may be ordered from the FI or through an authorized third-party permitted by the FI. Once enrollment is completed via interface 123 with cloud/server 110 and the customer is in possession of at least one deposit bag. The workflows of system 100 proceed as follows.

A customer determines that a drop box deposit is needed for valuable media (currency and checks in the examples that follow—although it is to be noted that the valuable media can be any of the items listed above). Operating deposit/app interface 123, the customer enter a total of currency notes per denomination, a total number of change (coins) per denomination, and a total value of checks associated with a pre-staged drop box deposit. These totals are provided through deposit app/interface 123 to pre-stage manager 123. The customer than operates a camera of device 120 to capture a code (such as a Quick Response (QR) code) affixed to the bag. The code provides a unique identifier for the bag and other encoded or linked information. Deposit/App interface 123 sends the code to pre-stage manager 113. The totals per denomination and checks are assigned to a pre-staged transaction identifier associated with or linked to the customer by pre-stage manager and linked to the deposit bag via the code.

It is noted that the code of the deposit bag may be scanned and provided from deposit/app interface 123 to pre-stage manager 113 before the currency denomination totals and check values are entered into the interface by the customer. That is, at any point during the workflow but before the pre-staged transaction is finalized, the deposit bag code can be provided to pre-stage manager 113.

In an embodiment, the code is a unique string of digits, characters, or a combination of digits and characters, which the customer reads off the deposit bag and inserts into a field within an interface screen of the deposit/app interface 123. So, the code need not be a scannable code.

In an embodiment, the code is a QR or bar code that also includes a unique readable string representing an identifier for the deposit bag. If the camera of device 120 is unable to automatically scan the code, the customer may alternatively enter the readable string into a field within an interface screen of the deposit/app interface.

Once the denomination totals and check values are entered and linked to a pre-staged transaction identifier and the deposit bag by pre-stage manager 113, pre-stage manager 113 causes a total for the deposit and a summary of the deposit to be rendered within the deposit/app interface 123 for the customer to confirm as correct or for any edits desired by the customer should the customer have made any mistakes.

Once the pre-staged deposit transaction is confirmed, the customer takes the deposit bag to a transaction terminal 130 of the FI. Once at terminal 130, the customer places the code affixed to the bag in front of a scanner or camera of the terminal 130 for scanning. Transaction manager 133 sends the code to deposit manager 114. Deposit manager 114 decodes and links the code to the pre-staged deposit transaction identifier and the account of the customer and obtains pre-staged deposit transaction details (denomination totals and check values and total overall deposit amount) associated with the pre-staged deposit transaction identifier.

Deposit manager 114 sends an instruction to transaction manager 133 to open the shutter to the lock box 134 (unlock the lock box 134). Transaction manager 133 provides the instruction to the electromechanical shutter associated with lock box 134 and the shutter opens revealing a drop area inside the lock box 134. The customer drops the deposit bag into the drop area under the shutter of the lock box 134 and either the transaction manager 133 through further instruction or a sensor detecting the presence or weight of the deposit bag causes the shutter to close such that the drop area of lock box 134 is no longer visible to the customer and is no longer accessible to the customer at terminal 130.

The deposit bag is then urged from the drop area into a safe compartment or safe, which may be wholly contained within a housing of terminal 130 or which may be external to terminal 130 (such as a safe within a bank branch).

Transaction manager 133 sends a notification to deposit manager 114 that the deposit bag was received for the pre-staged deposit transaction identifier. Deposit manager 114 provides the pre-staged transaction details to backend financial system 117 for processing by the FI as a deposit transaction for the customer.

Deposit manager 114 also sends a real-time notification of the deposit details (pre-staged deposit details (denomination totals, check values, coin totals, etc.) to deposit dashboard 116. Deposit dashboard 116 sends a real-time notice to staff-operated devices 120 of the FI indicating that the deposit bag and deposit details are in possession of the bank and require verification before the deposit transaction can fully post to the account of the customer. The notice is displayed within a staff interface 123 (note 123 associated with both a customer-facing interface and a staff-facing interface—such that when referencing customer operators, it is referred to as deposit/app interface 123 but when referencing staff operators, it is referred to as staff interface 123). Deposit dashboard 116 also updates totals for cash on hand at the FI based on the received deposit details within a real-time dashboard that is presented to the staff within the staff interfaces 123 of staff devices 120.

The staff now have a real-time notice of a deposit bag and the deposit transaction as well as a real-time notice of cash on hand at the FI facility for cash planning operations, which may allow the staff to more intelligently schedule cash-in transient services for purposes of transporting excess cash to other FI facilities or requesting cash from the other FI facilities at the FI facility.

Additionally, staff does not have to wait for start of day or end of day procedures to retrieve the deposit bag from the safe or the terminal 130 (depending upon where the deposit bag was internally routed once dropped by the customer within the lock box 134—to a safe of the FI facility or to a safe enclosure within a housing of terminal 130).

When the deposit bag is retrieved for verification by a staff member or a pair of staff members (when required by compliance), audit manager 114 is alerted that the safe was opened or that the safe enclosure of terminal 130 was opened by a staff member. Cameras situated proximate to the terminal 130, within a safe, and throughout the FI facility provide images of the staff member(s) while the deposit bag is being handled. Moreover, at least one staff member operates a device 120 with staff interface 123 rendering verification screens and options for interaction and selection by the staff member. The compliance procedure for verifying the contents of the deposit bag is controlled through the staff interface 123 and monitored through the images provided by the cameras by audit manager 115. In an embodiment, staff interface 123 includes an option for the at least one staff member to open the safe. Interaction with the staff interface 123 records the date and time and that the safe was opened as long as an identifier for the safe; all of which is recorded in an audit log for compliance and auditing.

Audit manager 115 monitors entries made by the staff member within the staff interface 123 and monitors through computer vision physical actions and behaviors of the staff member or staff members during the entries. Any required confirmations and verifications for the compliance procedure are noted in both the staff interface 123 and by the audit manager within an audit log for the deposit. The video is indexed and linked to the required steps and confirmations associated with the compliance procedure, so that video clips that correspond to the steps and confirmations can be recalled and viewed during any audit of the deposit verification. If a violation in the compliance procedure is detected by audit manager 115 a security alert can be raised to a security system associated with the FI facility and/or the backend financial system 117. Moreover, each device 120 and/or 130 interacted with by the staff maintains its own log that includes each staff member (teller) credentials used for logging in or gaining access, such that there can be multiple audit logs for compliance and tracking.

Once the staff member or members complete the deposit bag verification in view of the deposit details, a notice is sent by staff interface 123 and/or audit manager 115 to backend financial system 117. The deposit is validated and posted to the account of the customer, such that the customer can now rely on the deposit funds for purposes of making withdrawals for future cash flow needs of the customer. This is done in a timely fashion, which is unavailable with conventional drop box deposits today. Moreover, the positing of available deposited funds can occur same day or within hours. Depending upon the status/reputation/rating of customer with the FI, the FI may allow the funds to post immediately as soon as notice that the deposit bag was received within lock box 134. These are substantial improvements over conventional drop box workflows.

In an embodiment, the deposit/app interface 123 of the customer provides real-time updates for the deposit of the customer once it is dropped by the customer into the lock box 134. For example, the customer is notified when the bag was retrieved by staff, when verified by staff, whether there is any discrepancy between the staff determined values for the deposit versus what the customer entered for the pre-staged transaction, and when the FI has verified the deposit and funds are available to the customer from the customer's account. This allows the customer to know where the FI is at in processing the deposit at any given point in time.

In an embodiment, the audit trail for the deposit comprised in the deposit log can be made available to the customer through deposit/app interface 123; so, every authorized staff member of the FI and the customer can request and view the audit trail when needed. This improves conflict resolution when discrepancies are noted and customer relations.

In an embodiment, the deposit/app interface 123 provided to the customer includes options by which the customer can order deposit bags.

In an embodiment, the deposit/app interface 123 allows the customer to obtain codes or labels that can be printed by the customer to place on the customer's deposit bags.

In an embodiment, deposit dashboard 116 feeds real-time deposit details for deposit bags received to a cash prediction and management system of the financial backend system 117.

In an embodiment, audit manager 115 provides audit log information for customers (including any discrepancies) to a risk manage system of the financial backend system 117, such that a risk score can be maintained on a per customer basis. The audit manager 115 can use this to determine how accurate the customer is historically likely to be in reporting accurate values for deposit bags. Such information can be used to adjust available currency at the FI in real time via deposit dashboard 114 when a high-risk customer makes a deposit bag drop. For example, a customer reported deposit of $100 with a risk score of 0.2 may cause deposit dashboard to update the cash available at the FI based on the stated $100 deposit as being $80, since historically this customer is off by 20%. This can make cash prediction and management systems more accurate. Such a customer may also not be allowed to have the deposit funds made immediately available to the customer's account when the deposit bag is dropped in the lock box 134; rather such a customer may have to wait for the staff verification to access the funds.

In an embodiment, transaction manager 133 provides an interface for receiving the deposit details from the customer when the customer is already at the terminal 130 with the deposit bag. This can compliment the embodiment discussed above where the customer entered such information via the deposit/app interface 123; so, the customer can either provide the denomination totals for the currency and coins and the check values via a terminal interface of terminal 130 while at the terminal 130 to drop the deposit bag or provide the information in advance before arriving at the terminal 130 with the deposit bag.

In an embodiment, an electronic receipt is provided to the customer via deposit/app interface once the pre-staged deposit transaction completes (totals entered and bag identified via code).

In an embodiment, a printed receipt for the deposit transaction is printed at the terminal 130 and provided to the customer when the customer drops the deposit bag into the lock box 134.

In an embodiment, the lock box 134 includes a mechanical or an electromechanical component that automatically re-bags and re-labels the deposit bag when dropped by a customer (the original deposit bag is dropped inside an outer bag having its own label (unique identifier) when the customer drops the deposit bag into the lock box 134). The deposit bag's scanned identifier is automatically linked and associated with the re-bag's identifier (label). This ensures that should the original deposit bag become damaged or was deposited partially damaged that each deposit bag is re-bagged and re-labeled to avoid any subsequent disputes with the customer when the deposit amount asserted by the customer is different from what was verified by the staff and the original deposit bag was damaged or torn in some manner when deposited by the customer or during transit from the lock box 134 to the safe (become jammed with a different deposit within a chute from the lock box 134 to the safe, etc.).

In an embodiment, the pre-staged manager 113 deposit manager 114, audit manager 115, and deposit dashboard 116 reside on a different server or cloud 110 from that which is associated with backend financial system 117.

In an embodiment, interactions between the deposit/app interface 123, staff interface 123, and transaction manager 133 with components of cloud/server 110 is provided via an Application Programming Interface (API).

In an embodiment, transaction terminal 130 is an Automated Teller Machine (ATM), a Self-Service Terminal (SST), or a Point-Of-Sale (POS) terminal.

In an embodiment the user/staff operated devices 120 can include tablets, laptops, desktops, phones, and wearable processing devices.

The above-referenced embodiments and other embodiments are now discussed with reference to FIGS. 2-3.

Figure 2:
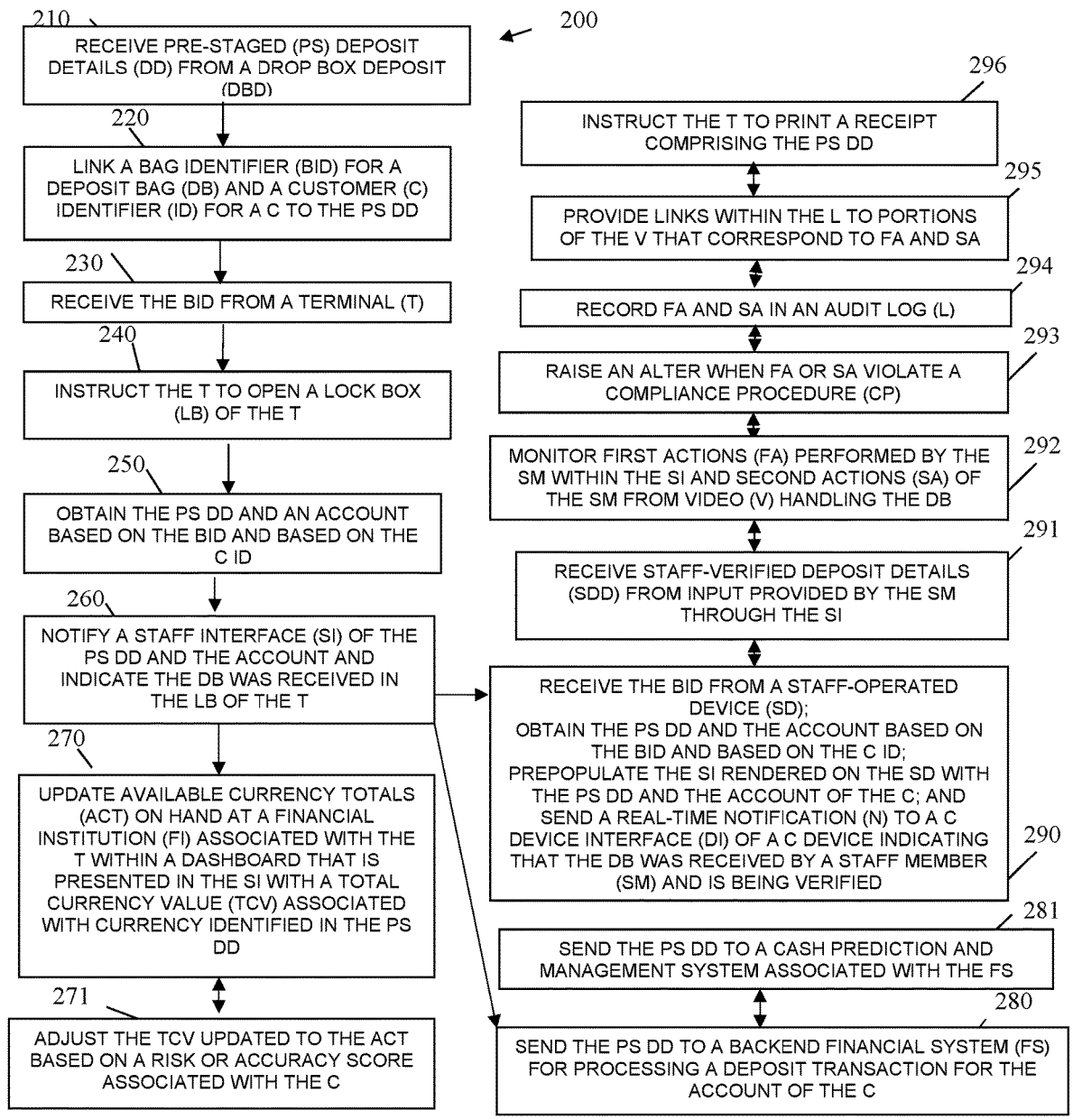
FIG. 2 is a diagram of a method for digitally processing a deposit, according to an example embodiment.

FIG. 2 is a diagram of a method 200 for digitally processing a deposit, according to an example embodiment. The software module(s) that implements the method 200 is referred to as a "drop box deposit manager." The drop box deposit manager is implemented as executable instructions programmed and residing within memory and/or a non-transitory computer-readable (processor-readable) storage medium and executed by one or more processors of one or more devices. The processor(s) of the device that executes the drop box deposit manager are specifically configured and programmed to process the drop box deposit manager. The drop box deposit manager may have access to one or more network connections during its processing. The network connections can be wired, wireless, or a combination of wired and wireless.

In an embodiment, the device that executes the drop box deposit manager is cloud 110. In an embodiment, cloud 110 comprises a plurality of servers logically cooperating and accessible as a single server 110 (cloud 110).

In an embodiment, the drop box deposit manager is all or some combination of 113 through 117.

At 210, the drop box deposit manager receives pre-staged deposit details associated with a drop box deposit that is planned by a customer.

At 220, the drop box deposit manager links a bag identifier for a deposit bag and a customer identifier for the customer to the pre-staged deposit details.

At 230, the drop box deposit manager receives the bag identifier for the deposit bag from a terminal 130.

At 240, the drop box deposit manager instructs the terminal 130 to open a lock box 134 of the terminal 130.

At 250, the drop box deposit manager obtains the pre-staged deposit details and an account based on the bag identifier and based on the customer identifier.

At 260, the drop box deposit manager notifies a staff interface 123 of the pre-staged deposit details and the account and the drop box deposit manager indicates the deposit bag was received in the lock box 134 of the terminal 130.

In an embodiment, at 270, the drop box deposit manager updates available currency totals on hand at a FI associated with the terminal 130 within a dashboard that is presented in the staff interface 123 with a total currency value associated with the currency that was identified in the pre-staged deposit details by the customer.

In an embodiment of 270 and at 271, the drop box deposit manager adjusts the total currency value updated to the available currency totals based on a risk or accuracy score associated with the customer.

In an embodiment, at 280, the drop box deposit manager sends the pre-staged deposit details to a backend financial system 117 for processing a deposit transaction for the account of the customer.

In an embodiment of 280 and at 281, the drop box deposit manager sends the pre-staged deposit details to a cash prediction and management system associated with the backend financial system 117.

In an embodiment, at 290, the drop box deposit manager receives the bag identifier from a staff-operated device 120. The drop box deposit manager obtains the pre-staged deposit details and the account based on the bag identifier and based on the customer identifier. The drop box deposit manager prepopulates the staff interface 123 rendered on the staff-operated device 120 with the pre-staged deposit details and the account of the customer. The drop box deposit manager sends a real-time notification to a customer interface 123 of a customer device 120 indicating that the deposit bag was received by a staff member and is being verified against the customer provided pre-staged deposit details.

In an embodiment of 290 and at 291, the drop box deposit manager receive staff-verified deposit details from input provided by the staff member through the staff interface 123.

In an embodiment of 291 and at 292, the drop box deposit manager monitors a first actions performed by the staff member within the staff interface 123 and second actions of the staff member from video as the staff member is in possession of and is handling the deposit bag.

In an embodiment of 292 and at 293, the drop box deposit manager raises an alert when at least one of the first actions or at least one of the second actions violate a compliance procedure.

In an embodiment of 293 and at 294, the drop box deposit manager records the first actions and the second actions in an audit log.

In an embodiment of 294 and at 295, the drop box deposit manager provides link within the audit log to portions of the video that corresponds to the first actions and the second actions.

In an embodiment of 295 and at 296, the drop box deposit manager instructs the terminal 130 to print a receipt comprising the pre-staged deposit details.

Figure 3:
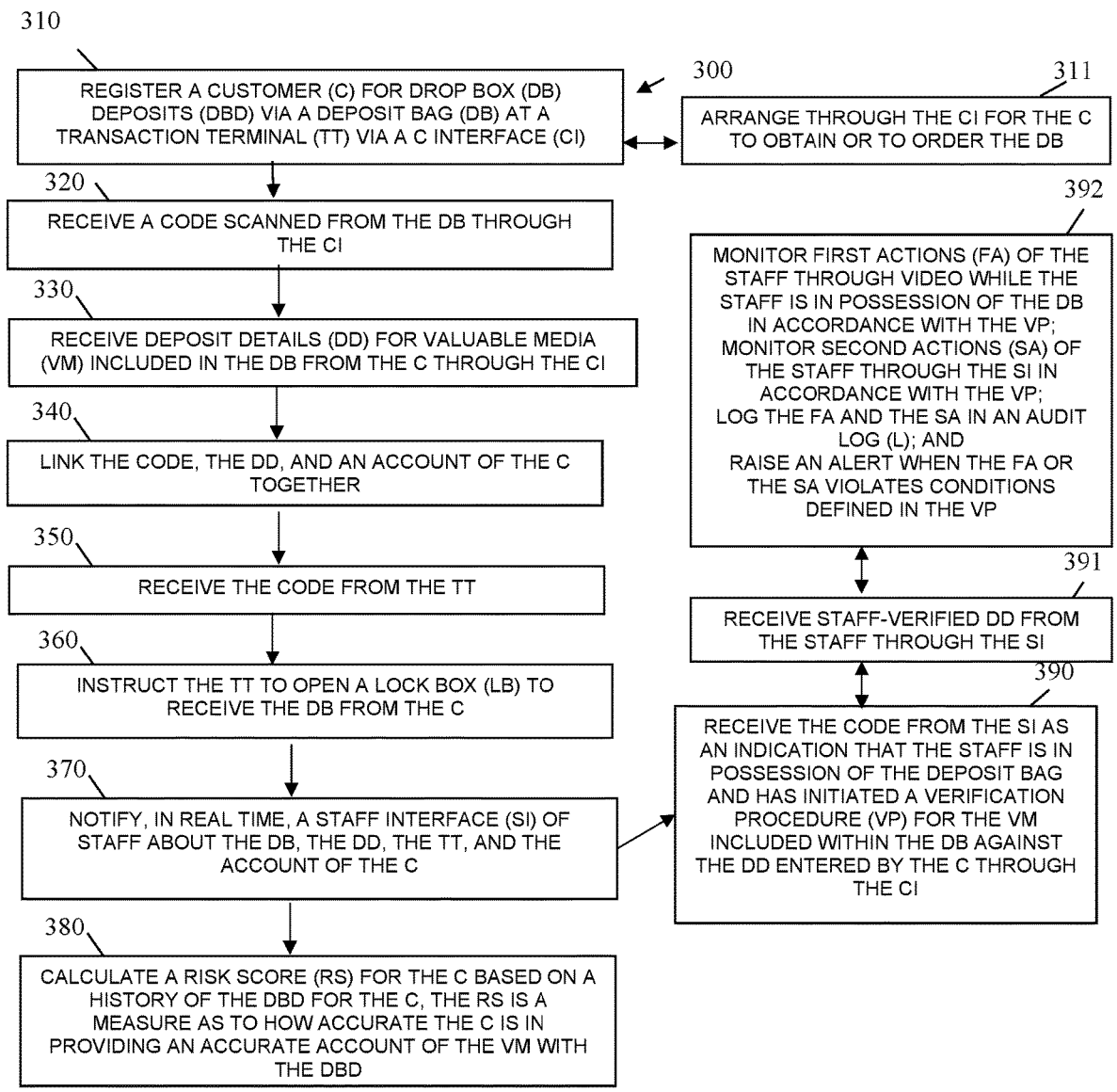
FIG. 3 is a diagram of another method for digitally processing a deposit, according to an example embodiment.

FIG. 3 is a diagram of another method 300 for digitally processing a deposit, according to an example embodiment. The software module(s) that implements the method 300 is referred to as a "drop box deposit workflow manager." The drop box deposit workflow manager is implemented as executable instructions programmed and residing within memory and/or a non-transitory computer-readable (processor-readable) storage medium and executed by one or more processors of a device. The processors that execute the drop box deposit workflow manager are specifically configured and programmed for processing the drop box deposit workflow manager. The drop box deposit workflow manager may have access to one or more network connections during its processing. The network connections can be wired, wireless, or a combination of wired and wireless.

In an embodiment, the device that executes the drop box deposit workflow manager is cloud 110. In an embodiment, the device that executes the drop box deposit workflow manager is server 110.

In an embodiment, the drop box deposit workflow manager is all of or some combination of 113, 114, 115, 116, 117, and/or method 200 of FIG. 2.

The drop box deposit workflow manager presents another and, in some ways, enhanced processing perspective of what was discussed above for cloud 110 and method 200.

At 310, the drop box deposit workflow manager registers a customer for drop box deposits via a deposit bag at a transaction terminal 130 via a customer interface 123.

In an embodiment, at 311, the drop box deposit workflow manager arranges through the customer interface 123 for the customer to obtain or to order the deposit bag.

At 320, the drop box deposit workflow manager receives a code scanned from the deposit bag through the customer interface 123.

At 330, the drop box deposit workflow manager receives deposit details for valuable media included in the deposit bag from the customer through the customer interface 123.

At 340, the drop box deposit workflow manager links the code, the deposit details, and an account of the customer together.

At 350, the drop box deposit workflow manager receives the code a second time from the transaction terminal 130.

At 360, the drop box deposit workflow manager instructions the transaction terminal 130 to open a lock box 134 to receive the deposit bag from the customer.

At 370, the drop box deposit workflow manager notifies, in real time, a staff interface 123 of staff about the deposit bag, the deposit details, the transaction terminal 130, and the account of the customer.

In an embodiment, at 380, the drop box deposit workflow manager calculates a risk score for the customer based on a history of drop box deposits for the customer. The risk score is a measure as to how accurate the customer is in providing an accurate account of the valuable media with the drop box deposits.

In an embodiment, at 390, the drop box deposit workflow manager receives the code from the staff interface 123 as an indication that the staff is in possession of the deposit bag and has initiated a verification procedure for the valuable media included within the deposit bag against the deposit details entered by the customer through the customer interface 123.

In an embodiment of 390 and at 391, the drop box deposit workflow manager receives staff-verified deposit details from the staff through the staff interface 123.

In an embodiment of 391 and at 392, the drop box deposit workflow manager monitors first actions of the staff through video while the staff is in possession of the deposit bag in accordance with the verification procedure. The drop box deposit workflow manager also monitors second actions of the staff through the staff interface 123 in accordance with the verification procedure. The drop box deposit workflow manager logs the first actions and the second actions within an audit log. The drop box deposit workflow manager raises an alert when any of the first actions or the second actions violates conditions defined in the verification procedure.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   receiving pre-staged deposit details associated a drop box deposit that is planned to be made by a customer;
   linking a bag identifier for a deposit bag and a customer identifier for the customer to the pre-staged deposit details;
   receiving the bag identifier from a terminal;
   instructing the terminal to open a lock box of the terminal, wherein the deposit bag when placed in the lock box is received inside an outer bag having an outer bag identifier, wherein the deposit bag is re-bagged and re-labeled when dropped into the lock box;
   linking the outer bag identifier to the bag identifier;
   obtaining the pre-staged deposit details and an account based on the bag identifier and based on the customer identifier; and
   notifying a staff interface of the pre-staged deposit details and the account and indicating the deposit bag was received in the lock box of the terminal.

2. The method of claim 1 further comprising:
   updating available currency totals on hand at a financial institution associated with the terminal within a dashboard that is presented in the staff interface with a total currency value associated with currency identified in the pre-staged deposit details.

3. The method of claim 2, wherein updating further includes adjusting the total currency value updated to the available currency totals based on a risk or accuracy score associated with the customer.

4. The method of claim 1 further comprising, sending the pre-staged transaction details to a backend financial system for processing a deposit transaction for the account of the customer.

5. The method of claim 4, wherein sending further includes sending the pre-staged deposit details to a cash prediction and management system associated with the backend financial system.

6. The method of claim 1 further comprising:
   receiving the bag identifier from a staff operated device;
   obtaining the pre-staged deposit details and the account based on the bag identifier and based on the customer identifier;
   prepopulating the staff interface rendered on the staff operated device with the pre-staged deposit details and the account of the customer; and
   sending a real-time notification to customer deposit interface of a customer-operated device indicating that the deposit bag was received by a staff member and is being verified.

7. The method of claim 6 further comprising:
   receiving staff-verified deposit details for the deposit bag from input provided by the staff member through the staff interface.

8. The method of claim 7, wherein receiving staff-verified deposit details further includes monitoring first actions performed by the staff member within the staff interface and second actions of the staff member from video captured of the staff member while handling the deposit bag.

9. The method of claim 8, wherein monitoring further includes raising an alert when at least one of the first actions or at least one of the second actions violate a compliance procedure.

10. The method of claim 9, wherein raising further includes recording the first actions and the second actions in an audit log associated with the compliance procedure.

11. The method of claim 10, wherein recording further includes providing links within the audit log to portions of the video that correspond to the first actions and the second actions.

12. The method of claim 11, wherein instructing further includes instructing the terminal to print a receipt comprising the pre-stage deposit details.

13. A method, comprising:
registering a customer for drop box deposits using a deposit bag at a transaction terminal via a customer interface;
receiving a code scanned from the deposit bag through the customer interface;
receiving deposit details for valuable media included in the deposit bag from the customer through the customer interface;
linking the code, the deposit details, and an account of the customer together;
receiving the code from the transaction terminal;
instructing the transaction terminal to open a lock box to receive the deposit bag from the customer, wherein the deposit bag when placed in the lock box is received inside an outer bag having an outer bag identifier, wherein the deposit bag is re-bagged and re-labeled when dropped into the lock box;
linking the outer bag identifier to the code; and
notifying, in real time, a staff interface for staff about the deposit bag, the deposit details, the transaction terminal, and the account of the customer.

14. The method of claim 13, registering further includes arranging through the customer interface for the customer to obtain or to order the deposit bag.

15. The method of claim 13 further comprising, calculating a risk score for the customer based on a history of the drop box deposits for the customer, wherein the risk score is a measure as to how accurate the customer is in providing an accurate account of the valuable media with the drop box deposits.

16. The method of claim 13 further comprising:
receiving the code from the staff interface as an indication that the staff is in possession of the deposit bag and has initiated a verification procedure for the valuable media included within the deposit bag against the deposit details entered by the customer through the customer interface.

17. The method of claim 16, wherein receiving the code from the staff interface further includes receive staff-verified deposit details from the staff through the staff interface.

18. The method of claim 17 further comprising:
monitoring first actions of the staff through video while the staff is in possession of the deposit bag and the valuable media in accordance with the verification procedure;
monitoring second actions of the staff through the staff interface in accordance with the verification procedure;
logging the first actions and the second actions in an audit log; and
raising an alert when at least one of the first actions or the second actions violate conditions defined in the verification procedure.

19. A system, comprising:
a cloud processing environment comprising at least one server;
the at least one server comprising a processor and a non-transitory computer-readable storage medium;
the non-transitory computer-readable storage medium comprises executable instructions; and
the executable instructions when executed on the processor from the non-transitory computer-readable storage medium cause the processor to perform operations comprising:
registering a customer for drop box deposits of valuable media at a transaction terminal via a customer interface;
receiving a code scanned from a deposit bag associated with a pre-staged deposit transaction of the customer through the customer interface;
receiving pre-staged deposit details from the customer for the pre-staged deposit transaction through the customer interface;
receiving the code scanned by the transaction terminal when the customer is ready to deposit the deposit bag for the pre-staged deposit transaction;
obtain the pre-staged deposit details based on the code;
instructing the transaction terminal to unlock a lock box of the transaction terminal to receive the deposit bag from the customer, wherein the deposit bag when placed in the lock box is received inside an outer bag having an outer bag identifier, wherein the deposit bag is re-bagged and re-labeled when dropped into the lock box;
linking the outer bag identifier to the code;
providing the pre-staged deposit details to a backend financial system as a deposit transaction made by the customer;
posting a notification in a staff interface identifying the pre-staged deposit details, the deposit bag, the customer, and the transaction terminal; and
monitoring staff when the code is received through the staff interface for a verification procedure that verifies the pre-staged deposit details against staff-determined details for the valuable media included within the deposit bag.

20. The system of claim 19, wherein the executable instructions when executed on the processor from the non-transitory computer-readable storage medium further cause the processor to perform additional operations comprising:
sending a real-time notification to the customer through the customer interface when the code is received through the staff interface indicating that the pre-staged transaction details entered by the customer through the customer interface is being verified by the staff.

* * * * *